United States Patent [19]

Kawasaki et al.

[11] Patent Number: 4,612,139

[45] Date of Patent: Sep. 16, 1986

[54] SEMI-CONDUCTIVE POLYOLEFIN COMPOSITIONS AND CABLES COVERED WITH SAME

[75] Inventors: Youichi Kawasaki; Kenji Igarashi, both of Yokohama, Japan

[73] Assignee: Nippon Unicar Co. Limited, Tokyo, Japan

[21] Appl. No.: 610,416

[22] Filed: May 17, 1984

Related U.S. Application Data

[63] Continuation of Ser. No. 333,846, Dec. 23, 1981, abandoned.

[30] Foreign Application Priority Data

Jan. 30, 1981 [JP] Japan .................................. 56-12605

[51] Int. Cl.[4] .............................................. H01B 1/06
[52] U.S. Cl. ...................................... 252/511; 524/377
[58] Field of Search ................. 252/511, 578; 524/495, 524/496, 377, 386; 174/102

[56] References Cited

U.S. PATENT DOCUMENTS

| | | | |
|---|---|---|---|
| 2,446,387 | 8/1948 | Peterson | 174/105 |
| 2,879,244 | 3/1959 | Coler | 260/32.6 |
| 3,206,419 | 9/1965 | Pritchard | 260/23 |
| 3,361,702 | 1/1968 | Wartman et al. | 260/33.2 |
| 4,169,816 | 10/1979 | Tsien | 252/511 |
| 4,305,849 | 12/1981 | Kawasaki et al. | 252/567 |
| 4,384,944 | 5/1983 | Silver et al. | 204/159.13 |
| 4,399,060 | 8/1983 | Glass | 252/511 |
| 4,412,938 | 11/1983 | Kakizaki et al. | 252/511 |

FOREIGN PATENT DOCUMENTS 2723488 11/1984 Fed. Rep. of Germany .

Primary Examiner—Josephine L. Barr
Attorney, Agent, or Firm—James C. Arvantes

[57] ABSTRACT

The disclosure of this application is directed to a semi-conductive composition, based on a polyolefin, carbon black and a polyethylene glycol, which is suitable for use as a semi-conductive layer, bonded to an insulation layer of an electrical cable, serving to protect the insulation from tree-like degradation, commonly referred to as water trees.

13 Claims, 4 Drawing Figures

SEMI-CONDUCTIVE POLYOLEFIN COMPOSITIONS AND CABLES COVERED WITH SAME

This application is a continuation of prior U.S. application: Ser. No. 333,846, Filing Date Dec. 23, 1981, which is a now abandoned.

SUMMARY OF THE INVENTION

The present invention relates to semi-conductive polyolefin compositions, suitable for use as semi-conductive layers bonded to primary insulation layers of electrical conductors, such as electrical cables, serving to protect the primary insulation layers from tree like degradation, commonly referred to as water trees. More particularly, the present invention relates to semi-conductive compositions based on a polyolefin, polyethylene glycol and carbon black, and to electrical cables having these compositions thereon as semi-conductive layers bonded to primary insulation layers.

BACKGROUND OF THE INVENTION

Water trees occur when an organic polymeric insulation material such as a polyolefin is subjected to an electrical field over a long period of time in an environment where water exists. They are called trees because they look like branched trees. In actuality, however, water trees are fine passages or voids which are visibly white when filled with water, but become invisible when dry. For purposes of observation, samples containing water trees must be boiled in water or dyed.

In contrast, electrical trees, which are conventionally called trees, are visibly black because they grow as a result of electrical discharges that carbonize the insulation material, leaving carbon therein. Chemical trees, on the other hand, occur in the insulation material of a cable, as for example, a copper cable, placed in an environment where a reactive gas, such as hydrogen sulfide, infiltrates to the surface of the copper conductor and forms copper sulfides and copper oxides thereon which grow into needle-like crystals. Thus, chemical trees appear black or reddish-brown in color and occur even when there is no electrical stress.

It is known that water trees grow from points in electrical insulation material, produced, for example, from polyolefin compositions, in which there are voids or extraneous matter such as metal. This is particularly true in the case of an insulated electrical cable which is subjected to high voltages while in a water environment, e.g. under water. Nevertheless, it is difficult to keep extraneous matter out of the insulation and to prevent voids from occuring, in spite of continued efforts to improve production processes.

In order to cope with this difficulty, the problem of water trees, it has been proposed to add to the polyolefin polymer compositions, small quantities of a salt of a strong electroylte as disclosed in published Japanese Patent No. 52-24938. Some still favor the belief that the presence of metal ions is a cause of water trees.

In Japanese laid-open Patent No. 52-145799, which discloses the utilization of large quantities of inorganic fillers as a counter measure for the degradation by water trees, there is disclosed an example in which an inorganic filler is used in combination with diethylene glycol. It should be noted, however, that the reason for using diethylene glycol is not explained in this patent. Also, an example without diethylene glycol, as set forth in this patent, gave a better result, in preventing water trees.

Another suppressant for degradation of an insulation material subjected to high voltage under water is disclosed in Japanese laid-open Patent No. 53-3700. According to one example of this patent, polyethylene glycol distearate, in minute amounts, is used as a suppressant. In view of the fact that this suppressant is merely as effective as metal salts of stearic acid, and that fatty acids, metal salts of fatty acids, and esters of fatty acids are referred to as suppressants, it is considered that the suppressant must be a fatty acid derivative having hydrophilic radicals, which are not specified in the specification. It should be noted that this patent makes no reference to polyethylene glycol.

Japanese laid-open Patent No. 54-60346 claims that a compound of less than 24 carbon atoms having in its molecule both a carboxylic acid moiety or a metal salt thereof, which have a great affinity for extraneous matters such as metals, and a double bond that chemically combines with polyolefins, is extremely effective as a modifier for crosslinked polyethylene compositions.

Among many proposals as counter measures for ordinary trees is the addition of a voltage stabilizer or alcohol. For instance, the effectiveness of a monohydric higher alcohol having a carbon number of from 6 to 24 is described in Japanese laid-open Patent No. 53-16746. The technology of this patent is disadvantageous in that the effectiveness of the alcohols does not last long. Such low molecular weight alcohols easily move among polyolefin molecules in the insulation and ooze out, as the conductor gets hot, to the surface of the cable from whence they evaporate or drop away.

Also, there is described in Japanese laid-open Patents Nos. 49-119937, 52-40547, 52-40553 and 52-40554, the addition of a polyhydric alcohol to tree resistant electrical insulating materials which contain, as an essential component, a voltage stabilizer such as ferrocene, dihydronaphthalene, dialkoxynaphthalene, phosphorane and para-nitroaniline halide. According to these patents, the addition of a polyhydric alcohol is claimed to effect an improvement in the dielectric strength.

It should be noted, however, that the polyhydric alcohol is merely described as a component of the same category as dispersants, surfactants and unsaturated polymers. Further, the polyhydric alcohols are effective only to such a degree that a slight difference can barely be recognized in the examples. In addition, polyhydric alcohols disclosed in these patents vary widely in molecular weight. The problem dealt with in these patents is not water trees which grow in the presence of water, but ordinary electrical trees which grow in insulation subjected to high voltages, as previously explained.

In the above noted Japanese laid-open Patents, polyhydric alcohols are described, secondarily, as water tree suppressants. Such polyhydric alcohols are represented by ethylene glycol, propylene glycol and butanediol, which are listed collectively together with a number of alicyclic polyhydroxyl compounds and aromatic polyhydroxyl compounds.

It should be noted that only polyethylene glycol is effective and polypropylene glycol is not, as established in Common Assignee's U.S. Application, identified below. This suggests that polyethylene glycol works in a manner different from that of polyhydric alcohols, used secondarily, according to the prior art.

The invention of U.S. Application Ser. No. 178,406, filed Aug. 15, 1980, now U.S. Pat. No. 4,305,849 granted Dec. 15, 1981, the disclosure of which is incorporated by reference, is based on a finding that water tree-induced degradation can be prevented by simply adding a small quantity of high-molecular weight polyethylene glycol to a polyolefin, without adding a voltage stabilizer, a carboxylic acid or metal salt thereof. This is quite different from the prior art wherein polyhydric compounds such as ethylene glycol or diethylene glycol were used, secondarily, in combination with voltage stabilizers; or polyethylene glycol end-blocked with stearic acid was used; as water tree suppressants.

BRIEF DESCRIPTION OF THE DRAWINGS

The present invention will be described in conjunction with the accompanying drawings wherein.

DETAILED DESCRIPTION OF THE INVENTION

Figure 1:
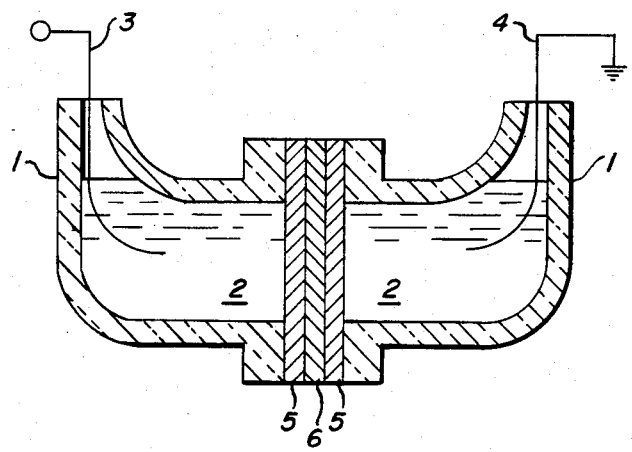
FIG. 1 is a schematic sectional view showing the experimental apparatus used to cause water trees to grow in a test piece.

As noted above, it has been disclosed in U.S. patent application, Ser. No. 178,406, filed Aug. 15, 1980, now U.S. Pat. No. 4,305,849 that the addition of a small quantity of polyethylene glycol of comparatively high molecular weight to an electrical insulation composition is very effective to prevent water trees from growing in the composition.

It has now been found, unexpectedly, that the water trees which grow into the insulation layer, from the interface between the insulation layer and the semi-conductive layer, can be eliminated completely if polyethylene glycol of comparatively high molecular weight is added in small quantities to the semi-conductive layer.

This invention is characterized by the fact that the presence of a small quantity of the additive, polyethylene glycol, in the semi-conductive layer gives rise to no electrical or mechanical problems. In addition, polyethylene glycol is inexpensive and easily available. Also, quite unexpectedly, the semi-conductive composition, with polyethylene glycol added, allows an extruder to deliver more output than is achieved with a composition without the polyethylene glycol additive. This means that it is possible to reduce the rpm of an extruder and still obtain the same level of throughput. The reduction of rpm, in turn, decreases the heat, generated by friction of the resin composition, resulting in such secondary effects as the elimination of "shutdown" of operation due to undesirable temperature rise in the extruder, energy savings and improvement in productivity.

The semi-conductive compositions of this invention are based on a polyolefin, carbon black in an amount sufficient to render the compositions semi-conductive and a polyethylene glycol in an amount of from 0.1 to 20 percent by weight, preferably from 0.3 to 5 percent by weight based on the weight of the polyolefin (thermoplastic or crosslinked).

The term polyolefin or olefin polymer as used herein includes polyethylene, ethylene-α-olefin copolymers, such as ethylenepropylene copolymers and the like, polypropylene, polybutene, polyisobutylene, poly-4-methyl pentene and copolymers containing these base units as major components such as an ethylene-vinyl acetate copolymer and the like.

Insulation layers can be produced from polyolefins, described above, such as polyethylene, polypropylene, ethylene-propylene copolymers, polybutene, polyisobutylene, poly-4-methyl pentene and the like.

It is to be noted that the technology of the present invention, which is characterized by adding polyethylene glycol to a semiconductive composition, has stemmed from the concept of disclosed in U.S. Application Ser. No. 178,406, filed Aug. 15, 1980, now U.S. Pat. No. 4,305,849. This invention is characterized by adding a polyethylene glycol, of the type and in the amount described herein, preferably a polyethylene glycol having more than 44 carbon atoms, in an amount of 0.3 to 10 percent by weight based on the weight of the polyolefin, into a composition to be used as primary insulation. By adding polyethylene glycol to a semi-conductive composition, bonded as a semi-conductive layer to a layer of an insulation composition containing a polyethylene glycol, it has become possible to make the tree resistant effect almost complete.

As to the term polyethylene glycol, this denotes a polyethylene glycol having a molecular weight of about 1,000 to about 20,000. Particularly desirable polyethylene glycols have a carbon number, that is carbon atoms of at least 30, preferably at least 80.

It has been previously pointed out that the amount of polyethylene glycol in the composition should be from 0.1 percent by weight to 20 percent by weight, based on the weight of the polyolefin. Under 0.1 percent by weight, the tree resistance effect decreases. This is further aggravated when polyethylene glycol of comparatively low molecular weight is employed. The addition of polyethylene glycol in an amount over 20 percent by weight is not desirable because it makes uniform mixing of the composition more difficult and decreases the bond strength between the insulation layer and the semi-conductive layer.

Carbon black, well known in the art, such as acetylene black, furnace black and carbon black sold under the trade name KETJEN BLACK, is used in amounts sufficient to render the compositions semi-conductive, generally on the order of about 5 to about 60 percent by weight, preferably about 10 to about 50 percent by weight based on the weight of the total composition.

The effectiveness of polyethylene glycol in this invention is not affected by the type of carbon black used.

The compositions of the present invention can contain crosslinking agents when the compositions are to be used as vulcanized or crosslinked products rather than as thermoplastic compositions. Vulcanizing or crosslinking agents are well known in the art and include organic peroxides as described in U.S. Pat. No. 3,296,189. These compounds can be used singly, or in combination with one another.

Also, the compositions of this invention can contain antioxidants such as sterically hindered phenols and amines, polymerized 2,2,4-tetramethylhydroquinoline, 4,4'-thio-bis-(3-methyl-6-tert-butylphenol), thio-diethylene-bis-(3,5-ditert-butyl-4-hydroxy)hydrocinnamate, distearyl-thio-diproprionate and the like. Other suitable and commonly used additives are stabilizers, inorganic fillers and the like.

Figure 2:
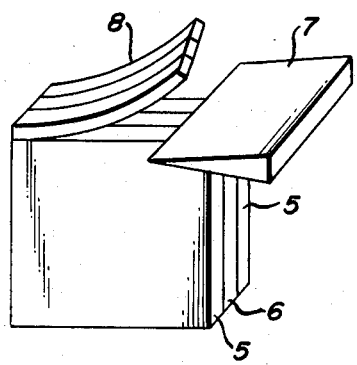
FIG. 2 is a perspective view showing a test piece being sliced by the edge of a microtome.

Test procedures conducted with respect to the data presented in the Examples will be described in reference to FIGS. 1 and 2 of the drawings in which a 3 mm thick test piece, made up of an insulation layer (6) and semi-conductive layers (5) is shown held at the center opening of glass vessel (1), dividing glass vessel (1) into two compartments. The test piece is in contact with 0.1 normal aqueous solution of sodium chloride (2), contained in glass vessel (1). Aqueous solution (2) is connected to a voltage source (3) and grounded at (4).

Each test piece was prepared by press molding a semi-conductive sheet, a sheet of insulation and a semi-conductive sheet, placed one over another. Each sheet was 1 mm thick. In the case wherein the laminate was crosslinked by the addition of an organic peroxide, as previously described, the crosslinked laminate was placed in a vacuum oven at a temperature of 90° C. for 48 hours to remove decomposition residues of the crosslinking agent.

A 50×50 mm square was punched out of each laminated sheet to make a test piece. Each test piece was placed in the central opening, 30 mm inside diameter, of glass vessel (1). After being clamped water tight, the glass vessel (1) was filled with 0.1 normal aqueous solution of sodium chloride (2), which works as an electrode. A high voltage lead wire (3) and a grounded wire (4) were inserted into aqueous solution (2) contained in vessel (1) as shown in FIG. 1. An AC voltage, 5 kv, 5 kHz was applied to the lead wire (3) for one week. Each test piece, exposed to the NaCl solution, was punched into a smaller piece measuring 20 mm by 20 mm. From this piece were cut 0.5 mm thick pieces (8) along the direction of thickness using a microtome (7) as shown in FIG. 2. Each test piece (8) was dyed with 2 percent aqueous solution of crystal violet to make water trees visible.

Twenty test pieces were selected, randomly, from 40 dyed test pieces, and observed under a 30X stereomicroscope. Those parts in which a noticeable growth of water trees was observed were photographed with a magnification of 50. Using 20 sheets of such microphotographs, the number of water trees was counted and the ratio of ocurrence per 1 mm (linear) was calculated. At the same time, the length of water trees was measured and the average and maximum values recorded.

Semi-conductive layers of the test pieces were prepared from semi-conductive compositions of ethylene-vinyl acetate copolymers compounded with predetermined quantities of carbon black, antioxidant, crosslinking agent and with and without varying quantities of polyethylene glycol.

Insulation layers of the test piece were prepared from compositions of polyethylene, antioxidant and a crosslinking agent.

Formulations of compositions used to prepare the semiconductive layers are described below:

| Semi-Conductive Composition A | Parts By Weight |
|---|---|
| Copolymer of ethylene-vinyl acetate containing 20 percent by weight vinyl acetate Melt Index - 20 | 59.25 |
| Carbon black-acetylene black | 40.00 |
| 4,4'-thio-bis(3-methyl-6-t-butylphenol) (antioxidant) | 0.2 |
| di-α-cumyl peroxide (crosslinking agent) | 0.55 |

| Semi-Conductive Composition B | Parts By Weight |
|---|---|
| Copolymer of ethylene-vinyl acetate containing 18 percent by weight vinyl acetate Melt Index - 6 | 83.8 |
| Carbon Black - Ketjen Black | 15 |
| 4,4'-thio-bis(3-methyl-6-t-butylphenol) | 0.2 |
| di-α-cumyl peroxide | 1.0 |

| Semi-Conductive Composition C | Parts by Weight |
|---|---|
| Copolymer of ethylene-vinyl acetate containing 20 percent by weight vinyl acetate Melt Index - 20 | 61.2 |
| Carbon Black - furnace Black | 38 |
| 4,4'-thio-bis(3-methyl-6-t-butylphenol) | 0.2 |
| di-α-cumyl peroxide | 0.6 |
| Formulation of the composition used to prepare the insulation layer was as follows: | |
| Polyethylene Melt Index - 2 | 98 |
| Density | 0.922 |
| 4,4-thio-bis(3-methyl-6-t-butylphenol) | 0.2 |
| di-α-cumyl peroxide | 1.8 |

Results obtained by testing the compositions in a manner previously described are tabulated in Table 1.

TABLE 1

|  | Control 1 | Control 2 | Example 1 | Example 2 | Example 3 | Example 4 | Example 5 | Example 6 |
|---|---|---|---|---|---|---|---|---|
| Semi-Conductive Composition A | 100* | 100* | 100* | 100* | 100* | 100* | — | — |
| Semi-Conductive Composition B | — | — | — | — | — | — | 100* | — |
| Semi-Conductive Composition C | — | — | — | — | — | — | — | 100* |
| Polyethylene Glycol, Percent by Weight** | — | 0.05 | 0.1 | 0.5 | 1.0 | 2.0 | 1.0 | 1.0 |
| Number of Water Trees per mm | 4.95 | 4.05 | 1.15 | 0.75 | 0.54 | 0.00 | 0.38 | 0.65 |
| Average Length of Water Trees, μ | 250 | 200 | 100 | 65 | 50 | — | 50 | 50 |
| Maximum Length of Water Trees, | 300 | 250 | 150 | 75 | 50 | — | 50 | 100 |

TABLE 1-continued

| | Control 1 | Control 2 | Example 1 | Example 2 | Example 3 | Example 4 | Example 5 | Example 6 |
|---|---|---|---|---|---|---|---|---|
| μ | | | | | | | | |

*parts by weight
**based on weight of ethylene-vinyl acetate copolymer
Polyethylene glycol of Table 1 had a molecular weight of about 20,000.

Table 1 shows the effects of polyethylene glycol, which vary depending on the quantity added.

At 0.05 percent by weight, as on Control 2, the growth of water trees is inhibited to a certain extent, but unsatisfactorily.

At 0.1 percent by weight, as in Example 1, fairly good effects are achieved from the fact that the occurrence of water trees is about one quarter that of Control 2 and the maximum length of water trees is one half that of Control 2.

At 2.0 percent by weight and up, the occurrence of water trees is not observed at all.

Adding polyethylene glycol in an amount more than 20 percent by weight is not desirable, as previously stated, because the resulting semiconductive resin composition becomes poor in physical properties and extrudability.

Figure 3:
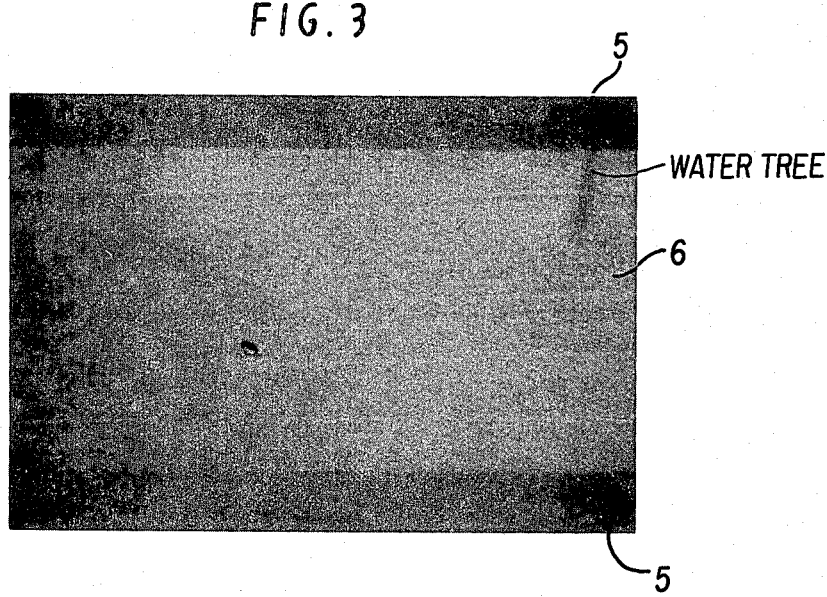
FIG. 3 is a microscopic photograph of a test piece of Control 1.
Figure 4:
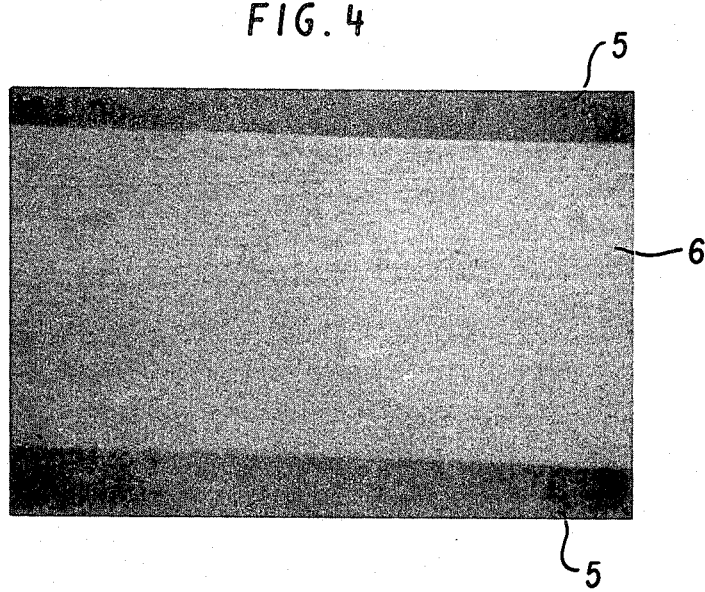
FIG. 4 is a microscopic photograph of a test piece of Example 3.

In order to help understand, vividly, the effects of this invention, microphotographs (X50) for Control 1 and Example 3 are shown in FIGS. 3 and 4, respectively. As can be seen, water trees grow between insulation layer 6 and semi-conductive layer 5 in Control 1 (FIG. 3).

The compositions of this invention are expected to find wide application in electrical cables, as for example, a cable comprising an electrical conductor, such as a copper conductor, having thereabout an inner semi-conductive layer, an electrical insulation layer and an outer semi-conductive layer and optionally a protective shield layer, coaxially arranged around the conductor in the order listed wherein at least one semi-conductive layer contains a polyethylene glycol as herein described. A particularly desirable construction is one wherein both insulation layer and semi-conductive layers contain a polyethylene glycol.

It is to be noted that in formulating compositions of this invention, mixtures of materials can be used if so desired.

What is claimed is:

1. A semi-conductive composition consisting essentially of a polyolefin, carbon black in an amount of about 5 to about 60 percent by weight based on the weight of the total composition and a polyethylene glycol having a molecular weight of about 1,000 to about 20,000, in an amount of 0.1 to 20 percent by weight based on the weight of the polyolefin.

2. A composition as defined in claim 1 wherein the polyolefin is polyethylene.

3. A composition as defined in claim 1 wherein the polyolefin is an ethylene-vinyl acetate copolymer.

4. A composition as defined in claim 1 which contains a crosslinking agent.

5. A composition as defined in claim 4 wherein the crosslinking agent is an organic peroxide.

6. A composition as defined in claim 5 wherein the crosslinking agent is di-α-cumyl peroxide.

7. A crosslinked product of the composition defined in claim 4.

8. A semi-conductive composition as defined in claim 1 wherein the polyethylene glycol has a molecular weight of about 20,000.

9. A semi-conductive composition as defined in claim 1 wherein the polyethylene glycol has a molecular weight of about 20,000 and the polyolefin is polyethylene.

10. A semi-conductive composition as defined in claim 1 wherein the polyethylene glycol has a molecular weight of about 20,000 and the polyolefin is a copolymer of ethylene-vinyl acetate.

11. A semi-conductive composition as defined in claim 1 wherein the polyethylene glycol is present in an amount of 0.3 to 5 percent by weight based on the weight of the polyolefin.

12. A semi-conductive composition as defined in claim 11 wherein the polyethylene glycol has a molecular weight of about 20,000 and the polyolefin is polyethylene.

13. A semi-conductive composition as defined in claim 11 wherein the polyethylene glycol has a molecular weight of about 20,000 and the polyolefin is a copolymer of ethylene-vinyl acetate.

* * * * *